United States Patent
Hetland et al.

(10) Patent No.: US 6,895,836 B2
(45) Date of Patent: May 24, 2005

(54) PLIERS-TYPE HANDTOOL HAVING INSULATION REMOVING MEANS

(75) Inventors: Detlev Hetland, Detmold (DE); Günther Hanning, Detmold (DE); Hartmut Schmode, Blomberg (DE)

(73) Assignee: Weidmueller Interface GmbH & Co. KG, Detmold (DE)

( * ) Notice: Subject to any disclaimer, the term of this patent is extended or adjusted under 35 U.S.C. 154(b) by 0 days.

(21) Appl. No.: 10/883,769

(22) Filed: Jul. 6, 2004

(65) Prior Publication Data

US 2005/0000322 A1 Jan. 6, 2005

(30) Foreign Application Priority Data

Jul. 5, 2003 (DE) ..................................... 203 10 377 U

(51) Int. Cl.[7] .............................................. B25C 3/00
(52) U.S. Cl. ............................ 81/44; 81/9.42; 81/9.43
(58) Field of Search ........................... 81/44, 9.4, 9.41, 81/9.42, 9.43

(56) References Cited

U.S. PATENT DOCUMENTS

| | | | | | |
|---|---|---|---|---|---|
| 4,407,174 A | * | 10/1983 | Schulze | ...................... | 81/9.42 |
| 5,572,911 A | * | 11/1996 | Schmode et al. | ............ | 81/9.43 |
| 5,724,870 A | * | 3/1998 | Wiebe et al. | ................ | 81/9.43 |
| 5,724,871 A | * | 3/1998 | Wall | ........................... | 81/9.43 |
| 6,079,296 A | * | 6/2000 | Muromoto | ................... | 81/9.43 |

FOREIGN PATENT DOCUMENTS

| | | |
|---|---|---|
| DE | 42 09 529 C1 | 7/1993 |
| DE | 19 512 132 C1 | 5/1996 |
| DE | 44 20 006 C2 | 4/1998 |
| EP | 05 62 229 B1 | 12/1999 |
| EP | 10 42 850 B1 | 11/2001 |

* cited by examiner

Primary Examiner—Lee D. Wilson
Assistant Examiner—Alvin J. Grant
(74) Attorney, Agent, or Firm—Lawrence E. Laubscher, Sr; Lawrence E. Laubscher, Jr

(57) ABSTRACT

A pliers-type handtool includes fixed and movable handle members pivotally connected intermediate their ends, a movable jaw member pivotally connected with the fixed handle member jaw end, and a toggle device connecting the movable jaw member with the movable handle member. A cutting member is mounted for reciprocation within a chamber defined between the fixed handle member and the movable jaw member. When the toggle device is operated from an expanded condition to a collapsed condition, the cutting member is displaced away from the clamping jaws, thereby to remove from the conductor the insulation layer that is severed from the conductor by opposed knife blades carried by the cutting member.

7 Claims, 3 Drawing Sheets

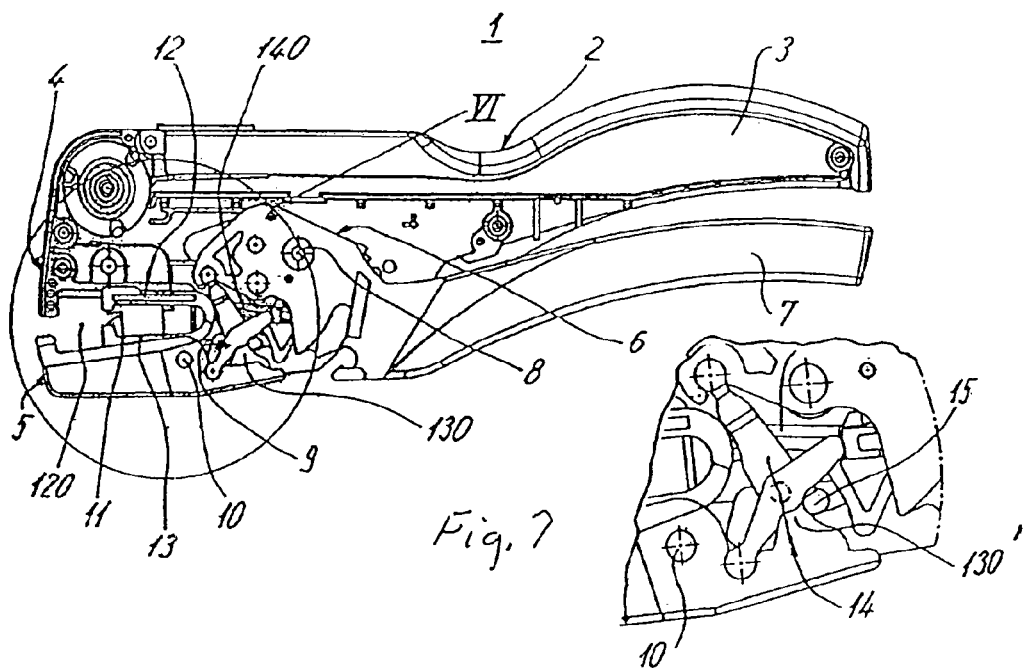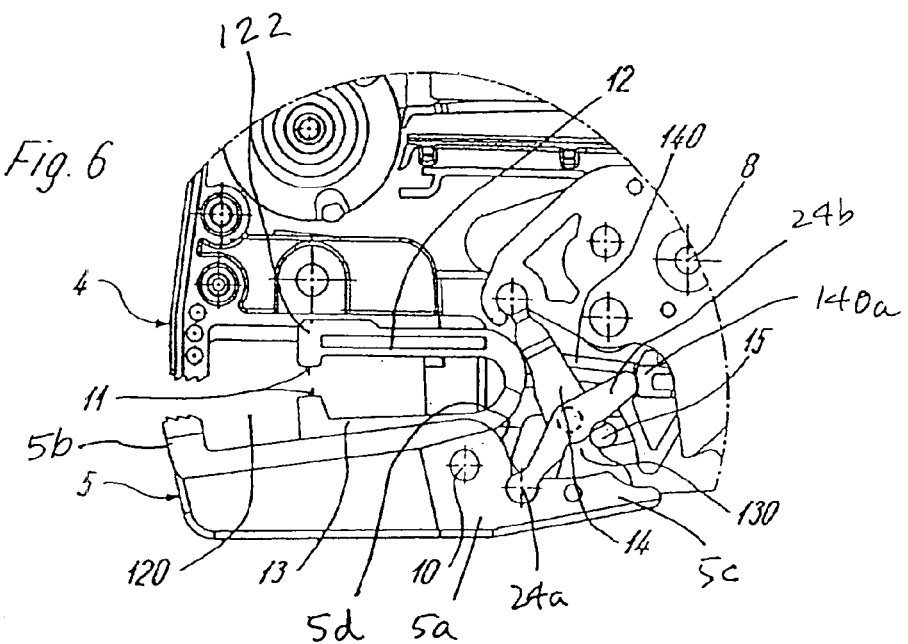

PLIERS-TYPE HANDTOOL HAVING INSULATION REMOVING MEANS

BACKGROUND OF THE INVENTION

1. Field of the Invention

An insulation-stripping pliers-type handtool is provided for severing and stripping a length of insulation from one end of an insulated conductor, toggle and cam means being provided for accurately controlling the length of the insulation layer that is to be removed from the conductor, and for retaining the severed insulation layer during the axial withdrawal of the conductor therefrom.

2. Description of the Related Art

Pliers-type handtools for severing lengths of insulation from an insulated conductor are well known in the prior art, as evidenced, for example, by the Applicant's European patent No. EP 0 562 229, which is hereby incorporated by reference. In this prior art handtool, there are provided an electrical conductor crimping station, an insulation stripping station, a gripping station, and the like.

Such handtools basically proved effective in practice. In the case of the previously known handtools, the working station used to remove insulation from the conductor ends in the final analysis acts in a force-dependent manner. Via the use of manual levers, toggle means and the movable clamping jaw, a clamping force is first of all applied for the purpose of clamping a conductor end and the force is then increased until such time as the insulation has been cut.

One drawback of these known tools is that as the insulation is axially removed, the pull-off length cannot be precisely defined due to the friction inside the entire working station. Consequently, the present invention was developed so that one can achieve a precisely defined insulating length.

This problem is solved according to the invention in that the pull-off motion is controlled in a path-dependent fashion by a control device and that one can thus ensure a defined insulating length.

One can thus reliably prevent any kind of trouble during the removal of insulation from the conductor ends caused by insulation jacket particles that are cut off but are not completely pulled off from the conductor.

A form of a control device that is particularly simple to make consists of a control cam that is provided on the movable clamping jaw, and a control cam follower that is molded upon an articulated lever of the toggle means that is guided on the control cam. The control device thus consists of means that are purely mechanical and that can be made inexpensively and that practically do not increase the cost of such handtools. Besides, such a control device is also permanently functional-operable in harsh everyday environments.

BRIEF SUMMARY OF THE INVENTION

Accordingly, a primary object of the present invention is to provide a handtool including fixed and moveable handle members pivotally connected together intermediate their ends, a movable jaw member pivotally connected with the movable handle member, toggle means connecting the movable jaw member for operation by the movable handle member, and a cutting member mounted for reciprocation by the toggle means to remove a severed layer of insulation axially from one end of an insulated conductor. Cam means control the displacement of the cutting member by the toggle means, and serve to lock the same in a position to retain the severed insulation layer during axial withdrawal of the conductor from the insulating cutting chamber.

In one embodiment, the cam means include a control cam member that is a separate element fastened to the movable jaw member, and in a second embodiment, the cam member is integral with the movable jaw member.

BRIEF DESCRIPTION OF THE DRAWINGS

Other objects and advantages of the invention will become apparent from a study of the following specification when viewed in the light of the accompanying drawings, in which:

FIG. 5 is a side elevational view of the handtool of the present invention with the handle means in the fully closed condition, and FIG. 6 is a detailed view of the circled portion of FIG. 5; and FIG. 7 is a detailed view of a second embodiment of the invention.

DETAILED DESCRIPTION OF THE INVENTION

Figure 1:
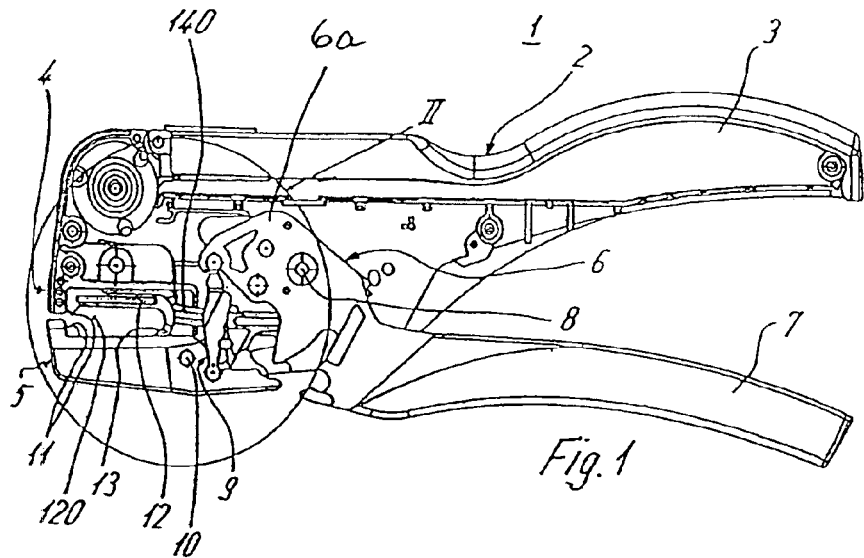
FIG. 1 is a side elevational view of the insulation-stripping handtool of the present invention with the handle portions in the open condition.
Figure 2:
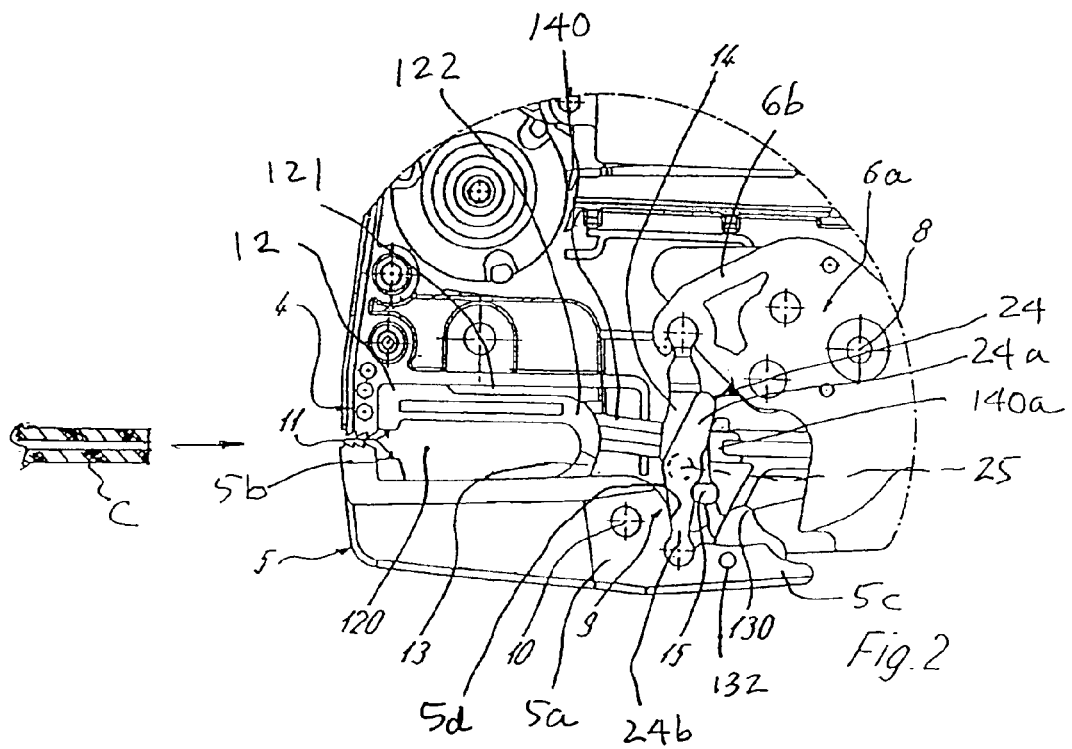
FIG. 2 is a detailed enlarged view of the circled portion of FIG. 1.

Referring first more particularly to FIGS. 1 and 2, the insulation-stripping pliers-type handtool 1 includes a fixed handle member 2 having an intermediate body portion, a first end defining a handle portion 3, and a second end carrying a fixed clamping jaw 4. Pivotally connected with the intermediate body portion of the fixed handle member 2 by means of the pivot pin 8 is a movable handle member 6 having a first end defining a handle portion 7, and a second end defining a drive portion 6a. Similarly, a movable jaw member 5 is pivotally connected intermediate its ends with the fixed handle member 2 by means of a pivot shaft 10. The movable jaw member carries at one end a movable jaw 5b opposite the stationery jaw 4, and at the other end, the movable jaw member has an end portion 5c that is connected by toggle means 9 with the drive end portion 6a of the movable handle member 6. The handle members are normally spring-biased toward the open position of FIG. 1.

The fixed handle member 2 and the pivotally connected movable jaw member 5 cooperate to define therebetween a stripping chamber 120 adjacent the fixed and movable jaws 4 and 5b. Slidably mounted within the chamber 120 by guide means 121 is a movable generally U-shaped horizontally-arranged cutting member 122 having a pair of horizontal arms 12 and 13 that are generally parallel and spaced within the chamber 120. The cutting member is normally spring-biased to the left toward a first position in which the free ends of the arms 12 and 13 terminate adjacent the jaws 4 and 5b, which free ends carry a pair of opposed knife blades 11. Thus, when the fixed and movable jaws are in the open condition, an insulated conductor C may be introduced longitudinally between the jaws 4 and 5b, and into the cable-stripping chamber 120.

The toggle means 9 includes a first link 14 that is pivotally connected at its upper end with the drive portion 6a of the movable handle member 6. The toggle means includes a second link 24 that is pivotally connected intermediate its ends with the link 14 by pivot pin 25. At its lower end, the link 24 is pivotally connected with the second portion 5c of the movable jaw member 5. A cam follower 15 integral with the link 14 is arranged for engagement with the cam surface of a stationary cam member 130 that is fastened to the second end portion 5c of the movable jaw member 5 by fastener means 132.

In operation, assume that one end of the insulated cable C has been inserted longitudinally within the insulation-stripping chamber 120, and that the toggle means 9 is in its illustrated expanded condition. As the handle portions 3 and 7 are initially pivoted together, the movable jaw 5 is driven in the clockwise direction via the expanded toggle means 9, thereby causing th conductor C to be clamped between the jaws 4 and 5, and to cause the edges of knife blades 11 to penetrate the insulation layer.

Figure 3:
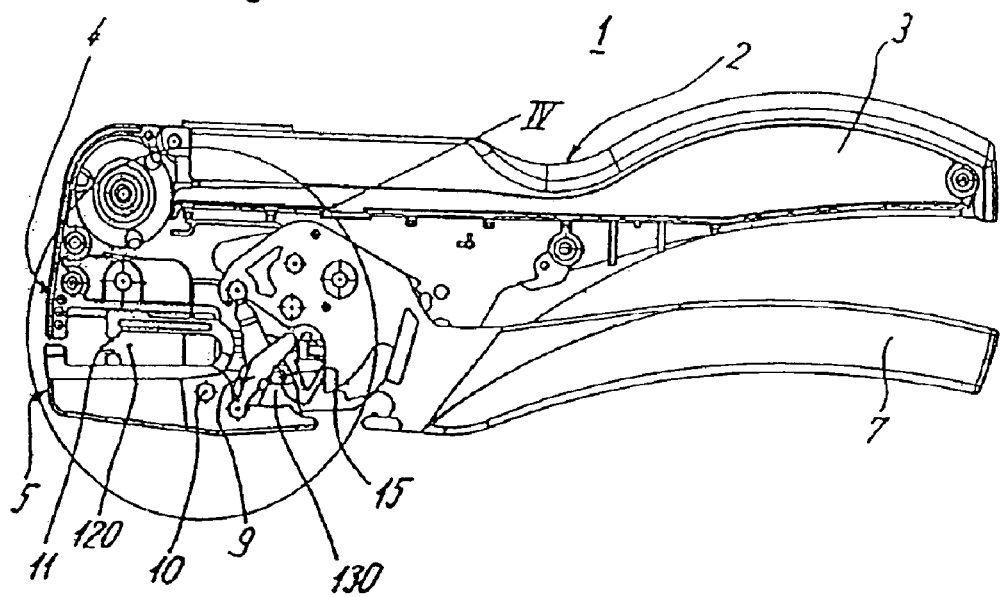
FIG. 3 is a side elevational view of the invention of FIG. 1 with the operating handles in an intermittent partially-closed condition.
Figure 4:
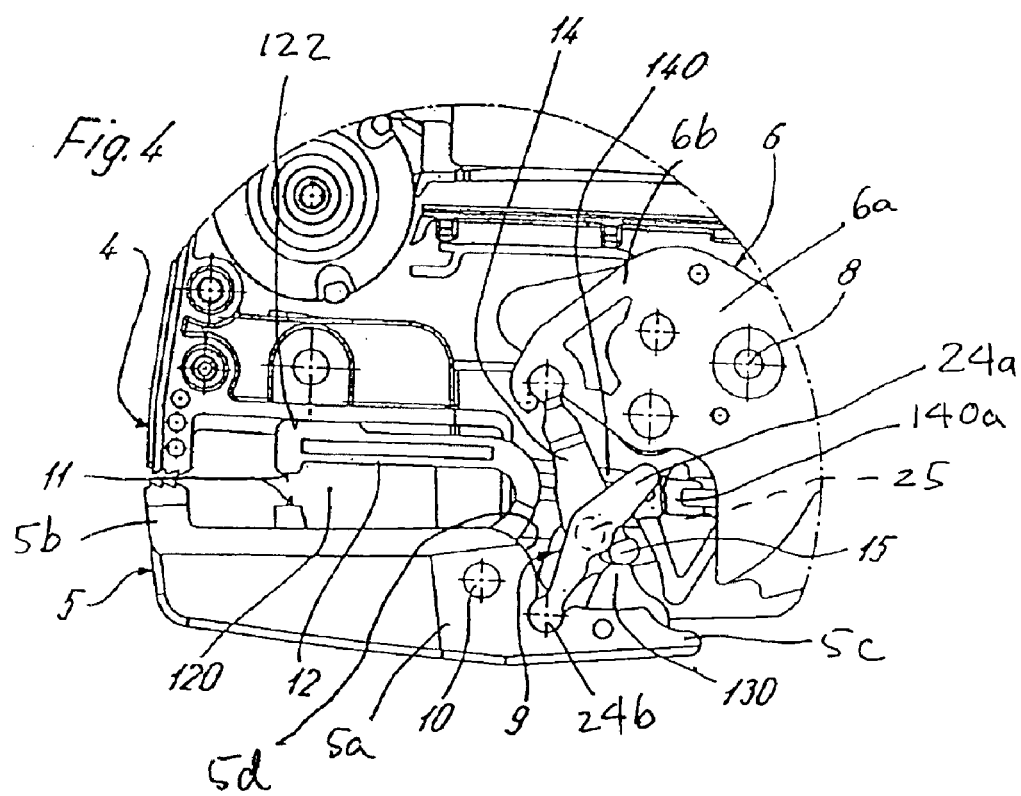
FIG. 4 is a detailed view of the circled portion of FIG. 3.

Assume now that the handle members 3 and 7 are pivoted together toward the illustrated partially closed intermediate position shown in FIGS. 3 and 4, thereby initiating partial collapse of the toggle means 9 via the cam surface 5d on the movable jaw member 5. During this collapsing movement of the toggle means, the end extremity of link end portion 24a engages a transverse portion 140b of the integral extension 140 of the slidably movable cutting member 122, whereby the cutting member 122 is progressively shifted to the right until the cam follower 15 engages the surface of cam 130. During this displacement of the cutting member 122 to the right, the knife means 11 carried by the legs 12 and 13 of the movable cutter member 122 pull the severed insulation layer to the right relative to the clamped conductor, thereby to separate the given length of severed insulation from the insulated conductor.

Referring now to FIGS. 5 and 6, when the handle members 3 and 7 are further pivoted toward the fully closed position, the cam follower 15 rides beyond the high point of the cam surface of cam member 130, thereby locking the toggle means in the fully collapsed condition in which the end 24a of lever 24 engages the transverse portion 140a to lock the cutting member 122 in place. With the cutting member 122 is locked in place and the clamping jaws retained in the open condition, the knife edges 11 serve to retain in the stripping chamber the severed insulation portion during the longitudinal withdrawal of the conductor from the stripping chamber 120. When the spring-biased operating handles 3 and 7 are released and returned toward the fully opened condition of FIG. 1, the cam follower 15 rides up on the surface of the cam 130 to release the toggle lever 24 from the transverse portion 140a, whereupon the spring biased cutting member 122 is shifted to the left toward its original position adjacent the fixed and movable jaws 4 and 5b.

The foregoing operation of the handtool produces a defined length of insulation for the shifting movement of the two cutting jaws 12 and 13, which length is equivalent to a pull-off movement for pulling off an insulation jacket area that has been cut through on a conductor end. The pull-off movement here is controlled in a path-dependent manner due to the cooperation between control cam 130 and cam follower 15, and does not depend on the friction inside the system.

Alternatively, as shown in FIG. 7, instead of being a separate element fastened to the moveable jaw member, the control cam 130 may be molded integrally in one piece with the movable clamping jaw 5. The first embodiment offers the advantage that existing handtool can be appropriately retrofitted with the subject invention.

FIGS. 1, 3, and 5 as well as the particular detail illustrations FIGS. 2, 4, and 6 in the sequence mentioned illustrate the starting position or the resting position of handtool 1, an intermediate position, and the terminal position during an insulation-stripping procedure.

While in accordance with the provisions of the Patent Statutes the preferred forms and embodiments of the invention have been illustrated and described, it will be apparent to those skilled in the art that various changes may be made without deviating from the inventive concepts set forth above.

What is claimed is:

1. A pliers-type insulation-stripping handtool for stripping a length of insulation from one end of an insulated conductor, comprising:

(a) a fixed handle member (2) having a central body portion a first end defining a fixed clamping jaw (4) and a second end portion defining a fixed handle (3);

(b) a movable handle member (6) having a central body portion (6a) a first end defining a drive end (6b), and a second end defining a movable handle (7) adjacent said fixed handle;

(c) pivot means (8) pivotally connecting together the central body portions of said fixed and movable members for pivotal movement about a first pivot axis between closed and normally open conditions;

(d) a movable jaw member (5) pivotally connected intermediate its ends with said fixed handle member for pivotal movement about a second pivot axis (10) parallel with said first pivot axis, said movable jaw member including a central body portion (5a), a first end portion (5b) defining a movable clamping jaw adjacent said fixed clamping jaw, and a driven end (5c) adjacent said first handle drive portion, said movable jaw member being pivotable between open and closed conditions relative to said fixed handle member, said fixed and movable members cooperating to define a chamber (120) adjacent said jaws;

(e) toggle means (9) connecting said movable member drive end with said movable jaw member driven end, said toggle means being operable between expanded and collapsed conditions when said handle members are in said open and closed conditions, respectively;

(f) an insulation cutting member (122) mounted in said chamber for reciprocation between a first position adjacent said jaws, and a second position spaced from said jaws, said insulating cutting member including:

(1) a pair of generally parallel spaced arm portions (12, 13) extending longitudinally of said chamber and having terminal portions adjacent said fixed and movable jaws when said cutting member is in said first position;

(2) a pair of opposed spaced inwardly directed knife members (11) carried by said arm terminal portions respectively, said knife members being operable to sever the insulation layer of an insulated conductor inserted longitudinally in said chamber when said movable and fixed members are initially pivoted from the open condition toward a partially closed condition in which the conductor is clamped between said jaws; and (3) means (140) connecting said cutting member with said toggle means to cause said cutting member to be displaced from said first position to said second position as said toggle means are progressively collapsed during the operation of said handle members from said open condition to said closed condition, thereby to pull the severed insulation from the end of the conductor; and (g) cam means (15, 130) arranged between said toggle means and said movable jaw member for controlling the displacement of said cutting member between said first and second positions, thereby to insure that a predetermined length of insulation is exactly separated from the conductor.

2. An insulation-stripping handtool as defined in claim 1, wherein said cam means includes a cam member (130) arranged on said movable jaw member second end, and a cam follower (15) mounted on one link of said toggle means.

3. An insulation-stripping handtool as defined in claim 2, and further including fastener means (132) fastening said cam member to said movable jaw member second end.

4. An insulation-stripping handtool as defined in claim 2, wherein said cam member is integral with said jaw member second end.

5. An insulation-stripping handtool as defined in claim 2, wherein said cam member and said cam follower cooperate to define a stop limiting the extent of collapse of said toggle means, thereby to define the said second position of said cutting member relative to said stripping chamber.

6. An insulation-stripping handtool as defined in claim 2, wherein said cam means is operable to lock said cutting member in said second position and to maintain said clamping jaws in the open condition, thereby to retain the severed insulation layer in place during the longitudinal removal of the conductor from said chamber.

7. An insulation-stripping handtool as defined in claim 5, wherein said toggle means is operable to pivot said movable jaw member to its open condition when said cutting member is in said second position.

* * * * *